Nov. 14, 1950  R. B. TURNBULL  2,529,979
SHEET MATERIAL TOY AIRCRAFT
Filed Dec. 6, 1948  3 Sheets-Sheet 1
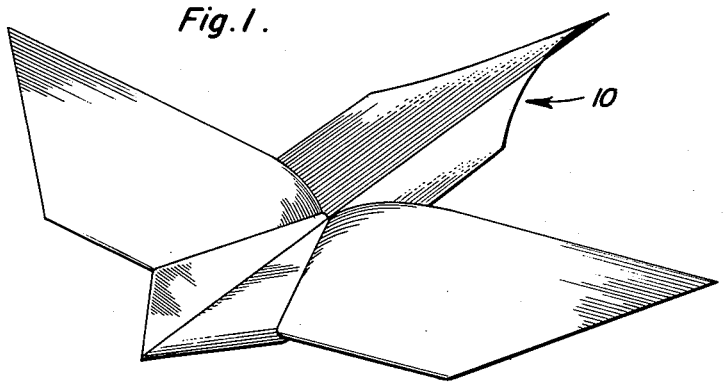
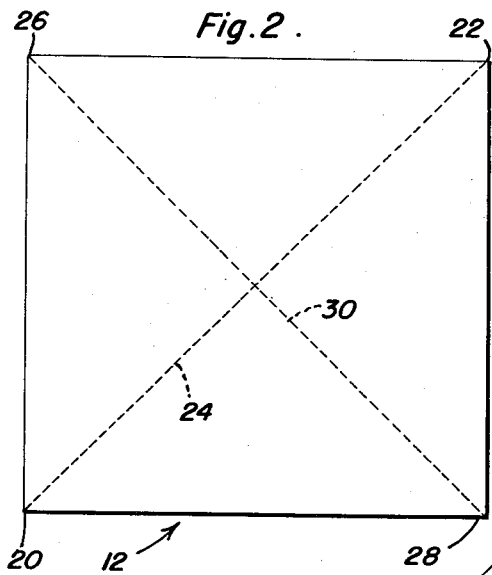
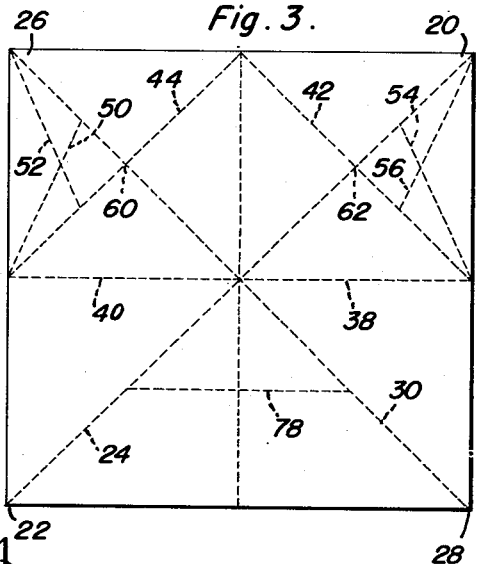
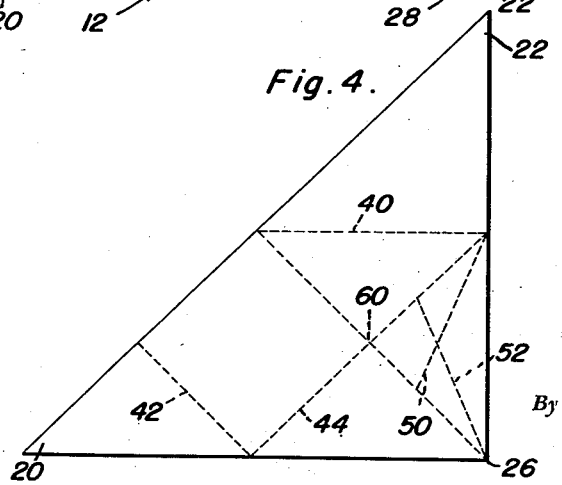
Inventor
Robert B. Turnbull
By Clarence A. O'Brien
and Harvey B. Jacobson
Attorneys

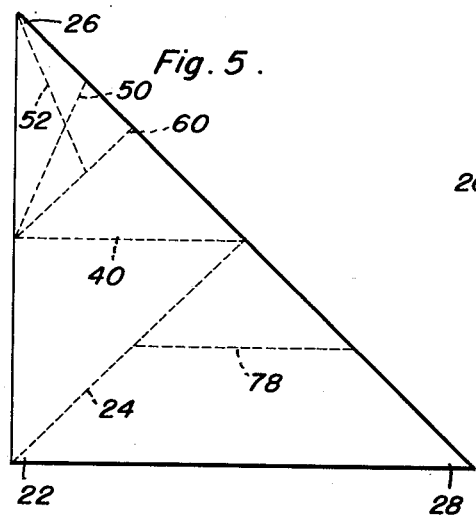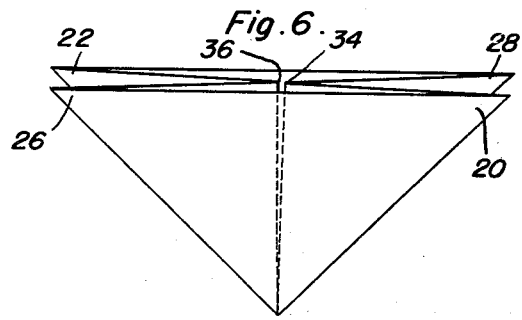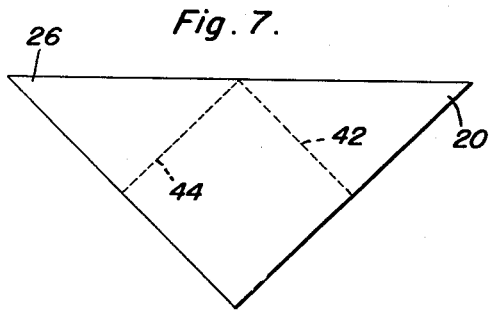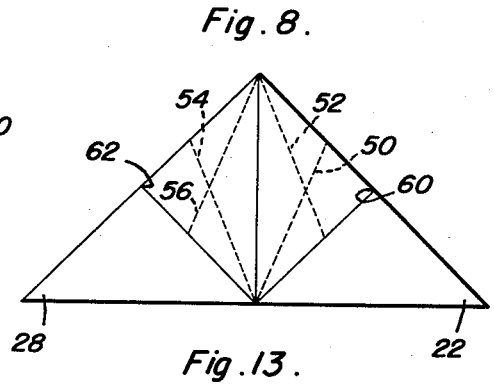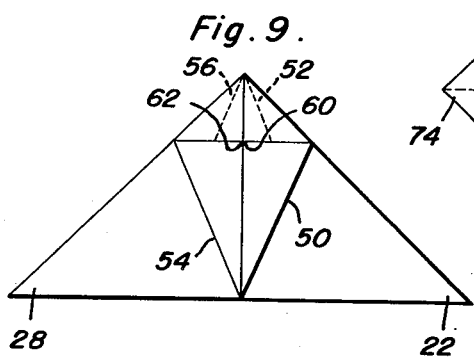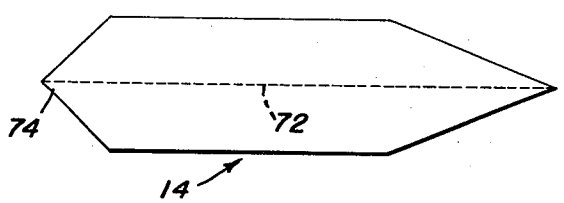

Nov. 14, 1950 R. B. TURNBULL 2,529,979
SHEET MATERIAL TOY AIRCRAFT
Filed Dec. 6, 1948 3 Sheets-Sheet 3

*Inventor*

Robert B. Turnbull

By Clarence A. O'Brien
and Harvey B. Jacobson
*Attorneys*

Patented Nov. 14, 1950

2,529,979

UNITED STATES PATENT OFFICE 2,529,979

SHEET MATERIAL TOY AIRCRAFT

Robert B. Turnbull, Holly, Mich., assignor of one-third to Eileen M. Turnbull and one-third to John H. Bush, both of Flint, Mich.

Application December 6, 1948, Serial No. 63,638

1 Claim. (Cl. 46—79)

This invention relates to novel and useful improvements in the art of amusement and educational devices.

An object of this invention is to supply a device which may be made to simulate an aircraft without the necessity of using glue or other analogous fastening elements.

Another object of this invention is to supply a blank having various crease lines and creases to form an aircraft of paper construction, which is quick folding into the composite readily and satisfactorily flyable toy.

Ancillary objects and features of novelty will become apparent to those skilled in the art, in following the description of the preferred form of the invention, illustrated in the accompanying drawings, wherein:

Figure 1 is a perspective view of the assembled device;

Figure 2 is a plan view of a blank showing initial creases to be made therein in dotted lines;

Figure 3 is a plan view of the same blank shown in Figure 1, showing further crease lines to be made therein;

Figure 4 is a plan view of the blank, showing the same partially creased;

Figure 5 is a view showing the blank having other crease lines therein;

Figure 6 is a perspective view of the blank in a partially folded condition;

Figures 7, 8 and 9 illustrate further conditions of the blank after it has been folded even further;

Figure 13 is a plan view of a second blank, used as a component of the aircraft shown in Figure 1;

Figure 10:
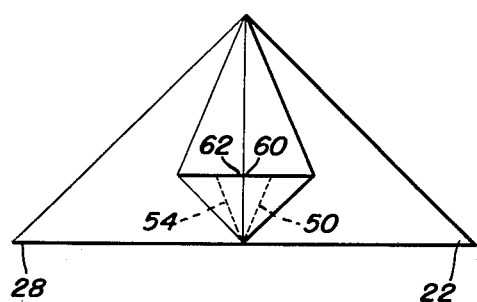
Figure 10, Figure 11 and Figure 12 illustrate the blank in further operational conditions.

The preferred material of construction of the present invention is paper. However, it is within the contemplation of the present invention to utilize other materials, as found appropriate and desirable. It is contemplated to utilize the exposed areas of the completed aircraft for advertising purposes.

The folding operations are most important in the construction of the present device, the actual materials being simply two blanks composed of paper. Accordingly, it is deemed appropriate to initially set forth the folds and manner of folding the two blanks in order to fabricate the device shown in Figure 1 and generally indicated by the reference numeral 10.

First the rectangular blank indicated generally at 12 is disposed on a flat surface such as a table or the like and corner 20 is folded to a position so that it is on top of corner 22. The blank is then creased as along dotted line 30. Then the blank is unfolded. The corner 26 is then folded upon corner 28 and the blank paper creased as along dotted line 24. The resultant crease marks are diagonal on the blank 12. The blank is then unfolded, leaving the crease lines 24 and 30 therein. When folding the blank to form the lines 30 and 24, the blank assumes the shape shown in Figures 4 and 5.

Then, the corners 20, 22, 26 and 28 are pinched together as shown in Figure 6, the corner 26 overlying the corner 22, while the corner 20 overlies the corner 28. The blank is creased along its inner edges at 34 and 36 respectively, forming crease lines 38 and 40 (see Figure 3). Dotted lines (see Figures 3 and 7) 42 and 44 respectively which are printed on the blank will appear and the corners 20 and 26 respectively are folded downwardly. Accordingly, there will appear printed lines 50 and 52 respectively on one of the flaps formed thereby and printed lines 54 and 56 respectively on the other flap formed thereby (see Figure 8). It is noted at this point that the creases and folds are made very firmly in order that the resulting toy will be of better quality.

Referring now to Figure 9 it will be seen that the newly formed corner 60 and the newly formed corner 62 are folded forwardly along the lines 50 and 54 firmly leaving exposed only a portion of the printed lines 52 and 56 respectively. Then, the last operation is undone, leaving again a blank as seen in Figure 8. The dotted lines 52 and 56 respectively are then used as folding centers and a blank similar to that shown in Figure 10 is produced. The folds are made crisply and accurately and then unfolded until a blank shown in Figure 8 is again attained.

Figure 11:
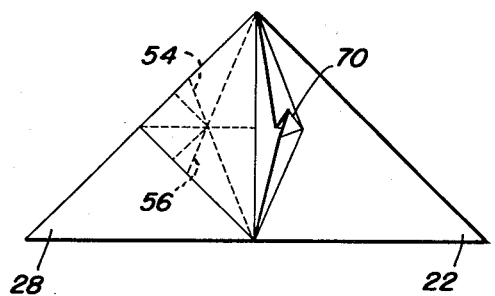
Figure 12:
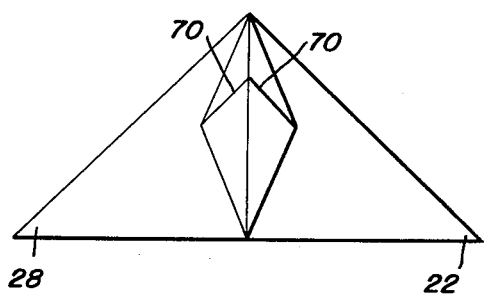

Then the paper is grasped by the fingers in order to form a sharp edge 70 and then folded forwardly, creasing along the edges firmly. This construction is seen operationally in Figure 11. The finished construction is seen in Figure 12.

Next, the substantially rectangular tail piece generally indicated at 14 is folded along its longitudinal center crease 72. It is creased sharply.

Figure 14:
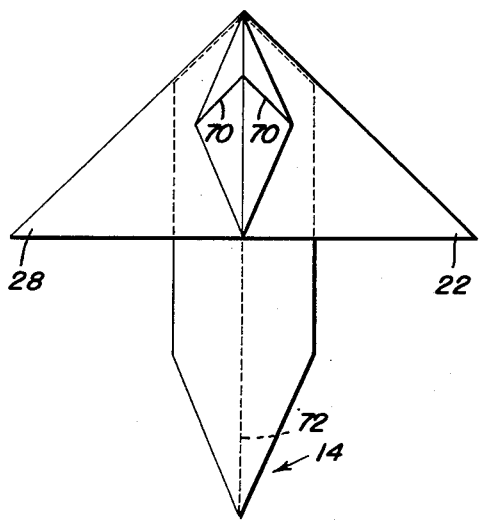
Figure 14 illustrates the two blanks combined.

The pointed end 74 of the tail piece is then inserted as far as possible into the wing, with the creased edge down toward the table or other support on which the operation is taking place. It is noted that the pointed portion 74 conforms to the apex of the wing section, this construction being seen best in Figure 14. The nose section is then bent downwardly along the line 78 (see Figure 3), not showing in Figure 14 since it is on the reverse side of the blank.

Figure 15:
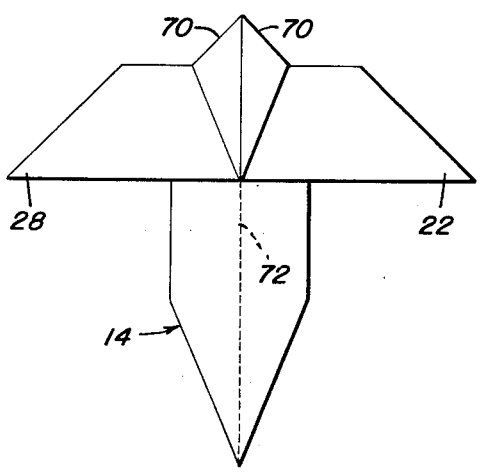
Figure 15 shows the blanks put together and in condition for final creasing.

Thus, the resulting structure is seen in Figure 15 and after appropriate smoothly curved contours are formed in the paper, the resulting device is seen in Figure 1. The wing and tail sections may be curved smoothly, as found desirable.

It is seen that nothing more is required to hold the tail section in place within the wing and nose sections than the frictional bond between the said tail section and folded substantially square blank 12.

It is apparent that certain variations may be made without departing from the spirit of the invention. Accordingly, limitation is sought only in accordance with the scope of the following claim.

Having described the invention, what is claimed as new is:

In a toy aircraft, a first and a second flat blank of material, said first blank being substantially square, creases extending diagonally of the blank and said blank being folded along said creases to form a triangular shaped blank of four thicknesses of material, and said triangular shaped blank being formed with creases in two of the thicknesses of material to form a square shaped member juxtaposed on the remaining two thicknesses of triangular blank, said remaining two thicknesses forming wings for the aircraft, and said square shaped member having tucks therein to form a nose section, the said remaining two thicknesses having a fold extending thereacross, a portion of the nose section projecting forwardly thereof, and said second blank having converging front edges disposed between said remaining two thicknesses to form a tail section and fuselage.

ROBERT B. TURNBULL.

REFERENCES CITED

The following references are of record in the file of this patent:

FOREIGN PATENTS

| Number | Country | Date |
|---|---|---|
| 501,014 | France | Mar. 31, 1920 |